United States Patent

Vogt

[15] 3,698,495
[45] Oct. 17, 1972

[54] ELECTRICAL WEIGHT INDICATING DEVICE

[72] Inventor: Norman H. Vogt, 457 Fisher Court, Clawson, Mich. 48017

[22] Filed: Sept. 25, 1970

[21] Appl. No.: 75,469

[52] U.S. Cl..................................177/211, 73/141 A
[51] Int. Cl................................................G01g 3/14
[58] Field of Search......177/210, 211, 154; 73/141 A

[56] References Cited

UNITED STATES PATENTS

| | | | |
|---|---|---|---|
| 3,213,400 | 10/1965 | Gieb | 73/141 A X |
| 3,095,551 | 6/1963 | Hebert | 73/141 A X |
| 3,136,157 | 6/1964 | Seed et al. | 177/211 X |
| 3,266,584 | 8/1966 | Lee | 177/211 X |
| 3,439,761 | 4/1969 | Laimins | 177/211 |
| 2,848,892 | 8/1958 | Hoffman | 73/141 A |

FOREIGN PATENTS OR APPLICATIONS 1,144,507  10/1961  Germany...............73/141 A

*Primary Examiner*—Richard B. Wilkinson
*Assistant Examiner*—George H. Miller, Jr.
*Attorney*—William T. Sevald

[57] ABSTRACT

An electrical weight indicating device signaling imposed weight in terms of output voltage having a stainless steel sealed case inclosing a chamber. A diaphragm plate in the case has a central load point or button and the two sets of resistors are aligned diametrically of the load point within the sealed chamber on either side of the load point. Input voltage is fed to the two resistor sets separately, but output voltage is combined on two sides from resistors of each set so that variations in plate or resistor bending are averaged out in the cumulation of the output voltage at the reading device so that output voltage is substantially linearly proportional to imposed weight.

1 Claim, 5 Drawing Figures

PATENTED OCT 17 1972 3,698,495
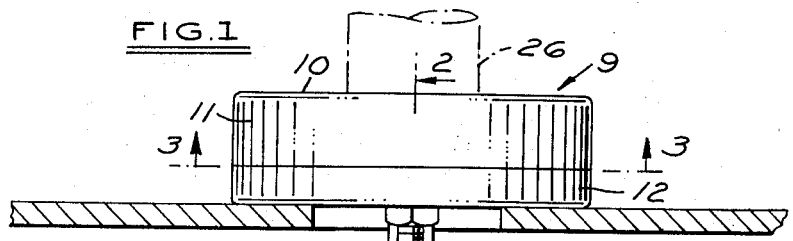
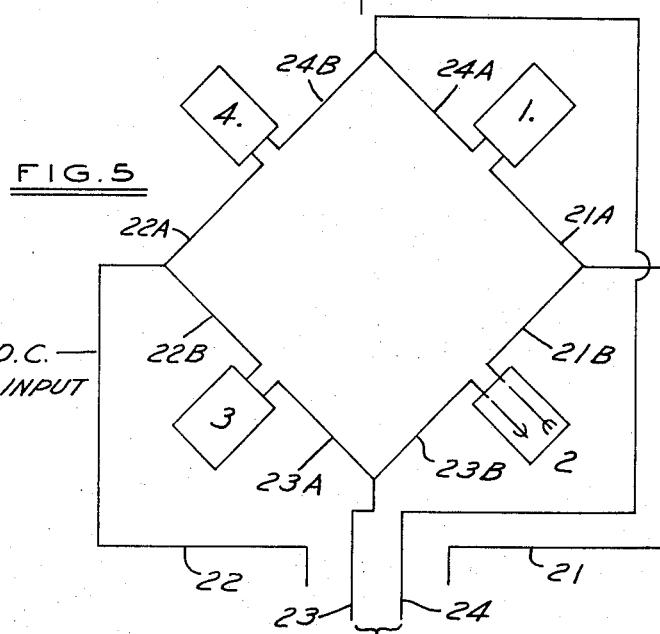
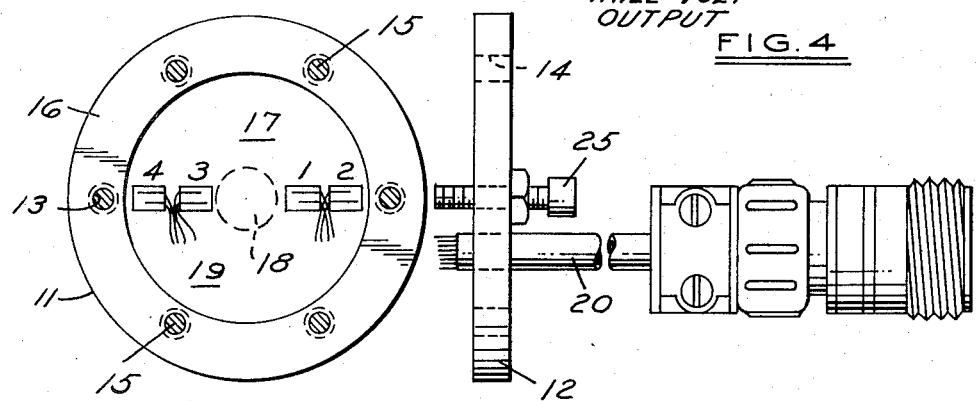
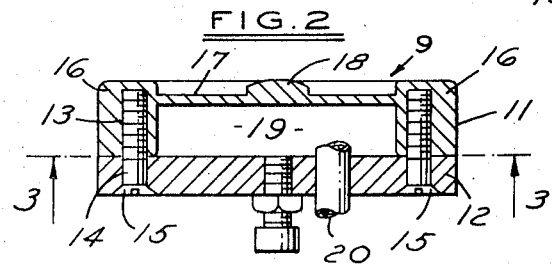
INVENTOR
NORMAN H. VOGT
BY
ATTORNEY

ELECTRICAL WEIGHT INDICATING DEVICE

This invention relates to electrical weight indicating devices for scales and in particular to a cell-type device capable of output voltage which is substantially linearly proportional to imposed weight load.

An object of the invention is to provide a sealed cell to eliminate environmental influences on the components and to provide means which are easily cleaned and disinfected as in weighing foods, drugs, meat products, etc.

An object of the invention is to provide a diaphragm plate for deflection under load and resistors bonded to the plate for deflection with the plate.

An object of the invention is to provide a weight load receiving button centrally in the plate between the resistors with the resistors and button lying in a straight line.

An object of the invention is to provide a wiring system for the resistors that cumulates the output voltage from the resistors to average-out the output voltage to compensate for plate deflection differences to increase accuracy of weight measurement.

Further objects of the invention are to provide an electrical weight reading cell which is simple in design and construction, easy and inexpensive to manufacture and to integrate in a weighing machine, which is substantially linear in voltage output proportional to imposed weight load, and which is reliable and long lasting in use.

These and other objects of the invention will become apparent from the following description of a weight indicating device embodying the invention taken in connection with the accompanying drawing, in which:

FIG. 1 is a side elevational view of a device embodying the invention mounted on a platform shown in cross-section and indicating a load imposing leg in dotted lines;

FIG. 2 is a vertical cross-sectional view of the device shown in FIG. 1 taken on the line 2—2 thereof;

FIG. 3 is a bottom plan view of the top portion of the device as seen in FIGS. 1 and 2 taken on the line 3—3 thereof showing the internal structure and resistor positions and indicating the load button in dotted lines;

FIG. 4 is a displaced side elevational view of the bottom portion of the device showing the overload abutment screw and electrical cable connection; and FIG. 5 is a diagrammatic wiring diagram of the resistors shown in FIG. 3.

Referring now to the drawing wherein like numerals refer to like and corresponding parts throughout the several views, the weight indicating device 9 disclosed therein to illustrate the invention comprises, a housing 10 having a top case 11 and a bottom cover 12. The case 11 has threaded apertures 13 and the bottom cover 12 has holes 14 at the apertures 13. Machine screws 15 extend through the holes 14 and engage the threaded apertures 13 to secure the cover 12 on the case 11.

The case 11 has a peripheral side wall 16 and diaphragm plate 17 supported on the wall 16. A load receiving button 18 is centrally located on the plate 17. The plate 17 is spaced from the cover 12 creating a sealed chamber 19 therebetween surrounded by the peripheral wall 16.

A first set of two resistors 1 and 2 and a second set of two resistors 3 and 4 are aligned diametrically of the load button 18. The button 18 and resistors lie in a straight line across the plate 17 within the chamber 19. An electrical cable 20 leads through the cover 12 into the chamber 19 for connection to the resistors. The cable 20 has the following wires.

A wire 21 and leads 21A and 21B connect to one side of both resistors 1 and 2 of the first set. A wire 22 and leads 22A and 22B connect to one side of both resistors 3 and 4 of the second set. The wires 21 and 22 carry the input voltage and this may be 5 volt D.C. or other suitable voltage.

A wire 23 has leads 23A and 23B connected to one side of resistor 2 of the first set and resistor 3 of the second set. A wire 24 has leads connected to one side of resistor 1 of the first set and resistor 4 of the second set. The wires 23 and 24 carry the output voltage which is in millivolts or other suitable voltage. The wires 23 and 24 are connected to a measuring or reading instrument or machine, not shown, such as a meter, computer, etc.

An adjustable screw 25 is threaded in the cover 12 centrally thereof and is adapted to lie slightly spaced from the bottom of the plate 17 opposite the load button 18. The screw constitutes a safety abutment for the diaphragm plate to protect it from being overloaded particularly by crash loads or exceedingly heavy accidental loads.

In operation, the device 9 is integrated in an electrical weighing system. Upon a weight load being imposed on the button 18, as by the post 26, the diaphragm plate 17 bends and this also bends the resistors 1, 2, 3, and 4. The bending of the resistors increases their resistance thereby decreasing output voltage in the wires 23 and 24 leading to the measuring means.

The normal unloaded output voltage of the resistors 1, 2, 3, and 4 is calibrated at zero weight in the system. Upon the weight load being imposed on the load button 18, and the diaphragm plate 17 and resistors bending under the load imposed, the output voltage drops from normal and the lower voltage is measured or read in terms of weight of the load imposed.

The diaphragm plate 17 and peripheral wall 16 are preferably formed integral and the plate 17 is thus inherently uniformly supported and it has been found that the plate thus bends or deforms under weight load substantially uniformly linearly. The resistors 1, 2, 3, and 4 are securely bonded to the plate 17 to insure bending with the plate 17 between the button 18 and the peripheral wall 16. To compensate for unequal bending of the resistors, the output voltage from the resistors is cumulated in the wires 23 and 24 leading from resistors of both sets on either side of the button 18.

Thus, if the output voltage differs from resistor to resistor under load, the differences are averaged out in the cumulation as the voltage from resistor 1 and 4 of opposite sets lying on both sides of the button 18 is fed to one side of the measuring device by wire 24 and leads 24A and 24B while voltage from resistors 2 and 3 of opposite sets lying on both sides of button 18 is fed to the other side of the measuring device by the wire 23 and leads 23A and 23B. The measuring device is thus balanced between output voltages which previously themselves balanced between opposite sets of resistors and opposite sides of the load button 18.

The case 10 is preferably made of stainless steel as are the screws 15 and 25 so that oxidation, contamination, etc. is minimal and so that the device is easily maintained. The fact that the resistors lie in a sealed chamber allow the device to be used under very adverse conditions without adverse affect on accuracy. The device has been used on scales in the meat packing industry where chemicals, brine, blood, water, salt, oil, and grease are prevalent and the device has proved more than satisfactory as to accuracy and durability.

The invention is defined by the appended claims.

I claim:

1. A load cell and circuit for indicating weight in terms of voltage, comprising, a diaphragm plate having a central load receiving button, an outer periphery, and means supporting said plate at said periphery, a first strain gauge resistor (1) bonded to said plate radially of and adjacent to said button, a second strain gauge resistor (2) bonded to said plate radially of and remote to said button, a third strain gauge resistor (3) bonded to said plate radially of and adjacent to said button, a fourth strain gauge resistor (4) bonded to said plate radially of and remote to said button;

all said strain gauge resistors lying on the same diameter;

all said resistors flexing with said plate at the point of bonding thereto and having input and output sides and restricting voltage proportional to the flexing of said plate at each said resistor as indicative of a portion of the weight load imposed on said button;

a first input wire leading to said input sides of said radially inner resistors (1) and (2);

a second input wire leading to said input sides of said radially outer resistors (3) and (4);

a first output wire leading from said output sides of said radially inner resistor (1) and said radially inner resistor (4); and a second output wire leading from said output sides of said radially outer resistor (2) and said radially outer resistor (3);

the voltage output of said first and second output wires being cumulated as a signal indicative of the weight load imposed on said button;

said first output wire signal voltage resulting from resistors (1) and (4) lying adjacent and remote respectively to said button on diametrically opposite sides of said button compensating for non-uniformity of deflection of said plate under load on opposite sides at radially inner and outer positions;

said second output wire signal voltage resulting from resistors (2) and (3) lying remote and adjacent respectively on diametrically opposite sides of said button compensating for non-uniformity of deflection of said plate under load on opposite sides at radially inner and outer positions;

said circuit furnishing power via said first input wire leading to said radially inner resistors in opposition to said second input wire leading to said radially outer resistors to balance the input voltage between said inner and said outer resistors;

said circuit first output wire furnishing signal voltage leading from and cumulating the signal voltage of one radially inner resistor in opposition to one radially outer resistor and said second output wire leading from and cumulating the signal voltage of the other radially inner resistor in opposition to the other radially outer resistor to balance the output voltage between said inner and outer resistors cumulation of the signal voltage of said output wires constituting balanced total signal voltage.

* * * * *